(12) United States Patent
Lin

(10) Patent No.: US 8,196,935 B2
(45) Date of Patent: Jun. 12, 2012

(54) SAFE AND QUICK RELEASE DEVICE FOR A TOOL ADAPTER

(75) Inventor: Tien-Lung Lin, Tali (TW)

(73) Assignee: Torque-Tech Precision Co., Ltd., Taichung County (TW)

( * ) Notice: Subject to any disclaimer, the term of this patent is extended or adjusted under 35 U.S.C. 154(b) by 1136 days.

(21) Appl. No.: 12/041,224

(22) Filed: Mar. 3, 2008

(65) Prior Publication Data

US 2009/0218774 A1    Sep. 3, 2009

(51) Int. Cl.
*B23B 31/107* (2006.01)

(52) U.S. Cl. .......... 279/2.01; 279/2.21; 279/29; 279/66; 279/76; 279/906; 81/177.85; 403/322.2; 403/325; 403/326

(58) Field of Classification Search ............ 279/76, 279/2.01, 2.21, 29, 66, 906, 2.23, 30, 74, 279/75, 82; 81/177.85; 403/322.2, 325, 403/326; *B23B 31/107, 31/22*
See application file for complete search history.

(56) References Cited

U.S. PATENT DOCUMENTS

| | | | | |
|---|---|---|---|---|
| 3,810,703 A * | 5/1974 | Pasbrig | ............ | 403/324 |
| 4,216,568 A * | 8/1980 | Anderson | ............ | 24/136 A |
| 4,688,975 A * | 8/1987 | Palm | ............ | 409/232 |
| 5,197,368 A * | 3/1993 | Meyer et al. | ............ | 83/698.31 |
| 5,207,129 A * | 5/1993 | Fossella | ............ | 81/63.2 |
| 5,209,146 A * | 5/1993 | Armbrust et al. | ............ | 82/160 |
| 5,233,891 A * | 8/1993 | Arnold et al. | ............ | 81/60 |
| 6,726,222 B2 * | 4/2004 | Rohm et al. | ............ | 279/71 |
| 7,913,592 B2 * | 3/2011 | Hu | ............ | 81/438 |
| 7,922,416 B2 * | 4/2011 | Davis et al. | ............ | 403/322.1 |
| 2008/0252024 A1* | 10/2008 | Rouweler | ............ | 279/82 |
| 2011/0121523 A1* | 5/2011 | Erickson et al. | ............ | 279/76 |

* cited by examiner

*Primary Examiner* — Eric A Gates
*Assistant Examiner* — Bayan Salone
(74) *Attorney, Agent, or Firm* — Ming Chow; Sinorica, LLC

(57) ABSTRACT

A safe and quick release device for a tool adapter includes a main body and a combination head. The main body has its front end axially bored with a combination groove with an open end. The combination groove has its opposite sides respectively bored with at least one position-limiting hole having its opposite ends respectively and annularly formed with a first position-limiting portion and a second position-limiting portion. A spherical position-limiting member is slidably disposed in the position-limiting hole and restrictedly positioned therein by the first and the second position-limiting portion. Thus, the position-limiting member is ready made, needless to be especially processed, can easily be installed for facilitating assembly and disassembly of the combination head, reducing processing cost.

5 Claims, 6 Drawing Sheets

SAFE AND QUICK RELEASE DEVICE FOR A TOOL ADAPTER

BACKGROUND OF THE INVENTION

1. Field of the Invention

This invention relates to a safe and quick release device for a tool adapter, particularly to one easy to be processed and able to reduce processing cost.

2. Description of the Prior Art

A first conventional tool safe and quick combination device 10 shown in FIG. 1 includes a main body 11 and a combination head 12. The main body 11 has its front end axially bored with a combination groove 111 having its opposite sides respectively bore with a position-limiting hole 112. The combination head 12 is received in the combination groove 111, having its front end formed with a tool connecting member 121 and having an elastic projecting block 13 disposed in the interior. When the combination head 12 is installed in the combination groove 111, the elastic projecting block 13 will be engaged and restrictedly fixed in the position-limiting hole 112 to be prevented from slipping off the main body 11 when the combination head 12 is operated. To disassemble the combination head 12 from the main body 11, a tool (a) has to be inserted into the position-limiting hole 112 to press against the elastic protruding block 13 and have it disengaged from the position-limiting hole 112, thus able to assemble or disassemble the combination head 12 quickly.

A second conventional tool safe and quick combination device 10 shown in FIG. 2, needless to employ a tool for disassembling the combination head 12, is provided with a press pin 14 with a stepped main body 141 in the position-limiting hole 112. In assembling, the stepped main body 141 is first received in the position-limiting hole 112 and then the upper inner side of the position-limiting hole 112 is provided with a position-limiting projection 113 by compression for restrictedly positioning the stepped main body 141 not to slip out. Subsequently, the upper end of the stepped main body 141 is compression formed with an upper cover 142 positioned on the stepped main body 141 to prevent the press pin 14 from dropping into the combination groove 111. The press pin 14 can be directly pressed against the elastic protruding block 13 to have the elastic protruding block 13 disengaged from the position-limiting hole 112, and thus the combination head 12 can easily be removed from the main body 11. However, it is quite complicated in processing and assembling the press pin 14 in the position-limiting hole 112. Further, referring to FIG. 2, when the press pin 14 is not used, the press pin 14, due to its own weight, will drop down and have its main body 141 resisting against the combination head 12, thus hindering assembly of the combination head 12, and hence the press pin 14 has to be pulled upward before the combination head 12 is to be assembled with the main body 11. Furthermore, being very small in size, the press pin 14 is not easily assembled.

SUMMARY OF THE INVENTION

The objective of this invention is to offer a safe and quick release device for a tool adapter, including a main body and a combination head. The main body has its front end axially bored with a combination groove with an open end. The combination groove has its opposite sides respectively bored with at least one position-limiting hole having its opposite openings respectively and annularly formed with a first position-limiting portion and a second position-limiting portion. A spherical position-limiting member is slidably disposed in the position-limiting hole and restrictedly positioned therein by the first and the second position-limiting portion. When the combination head is combined with the main body, the spherical position-limiting member will slide on the surface of the combination head, enabling the combination head to be installed with easiness. By so designing, the position-limiting member is ready made, needless to be especially processed, easily installed in the position-limiting hole of the main body, thus reducing processing difficultly and lowering processing cost.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
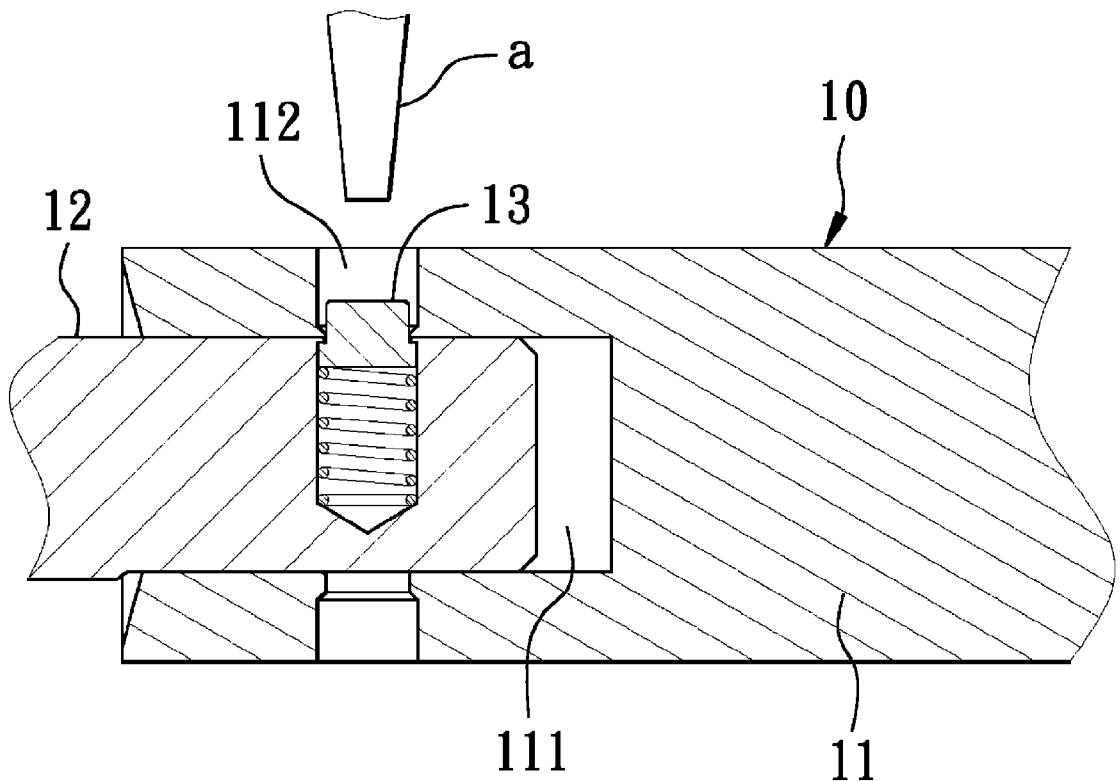
FIG. 1 is a cross-sectional view of a first conventional safe and quick combination device for a spanner.
Figure 2:
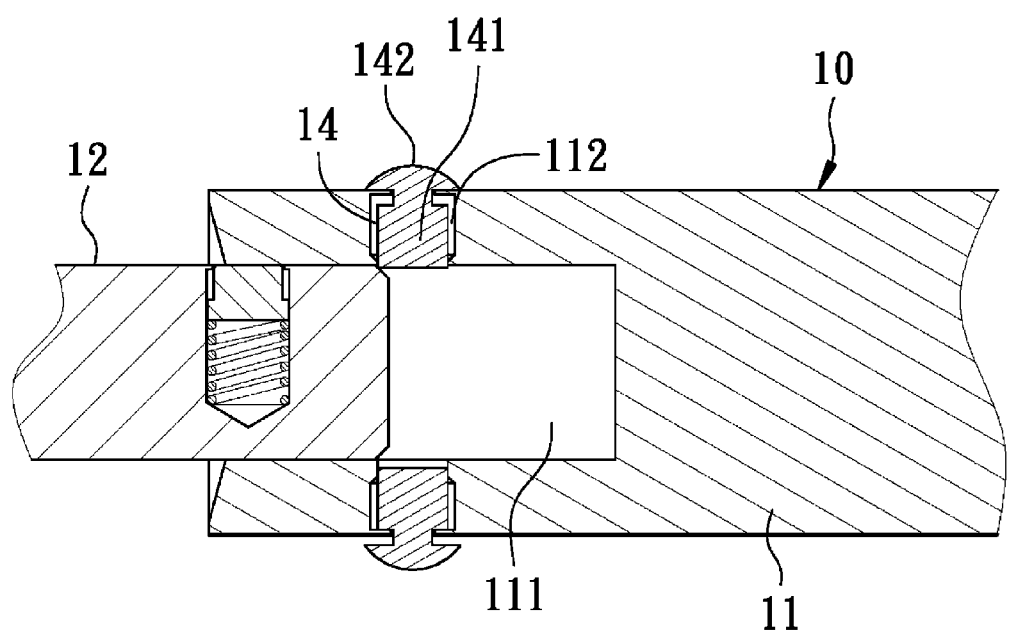
FIG. 2 is a cross-sectional view of a second conventional safe and quick combination device for a spanner.
Figure 3:
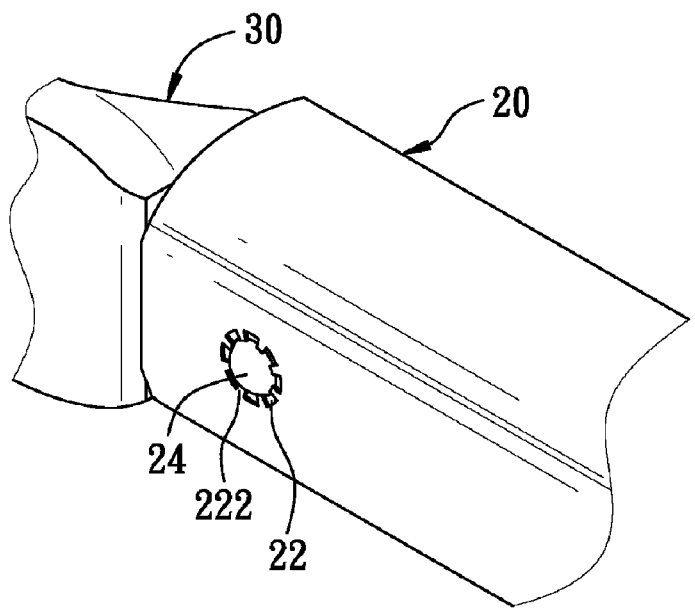
FIG. 3 is a perspective view of a first preferred embodiment of a safe and quick release device for a tool adapter in the present invention.
Figure 4:
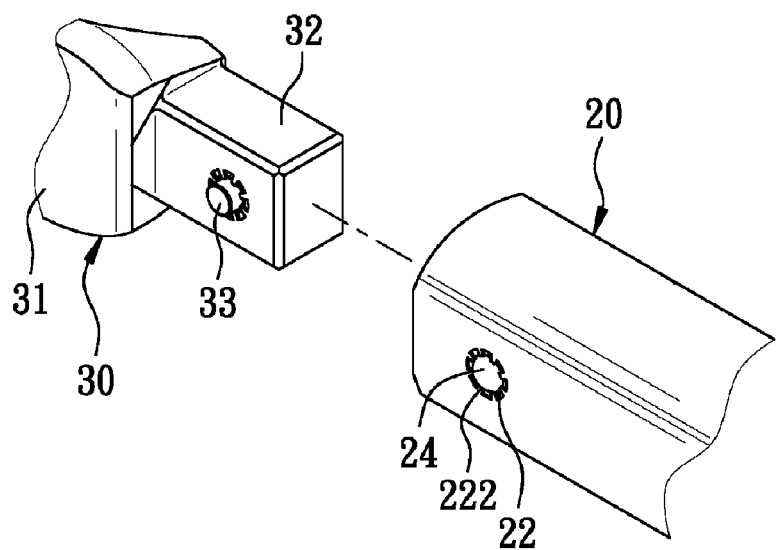
FIG. 4 is an exploded perspective view of the first preferred embodiment of the safe and quick release device for a tool adapter in the present invention.
Figure 5:
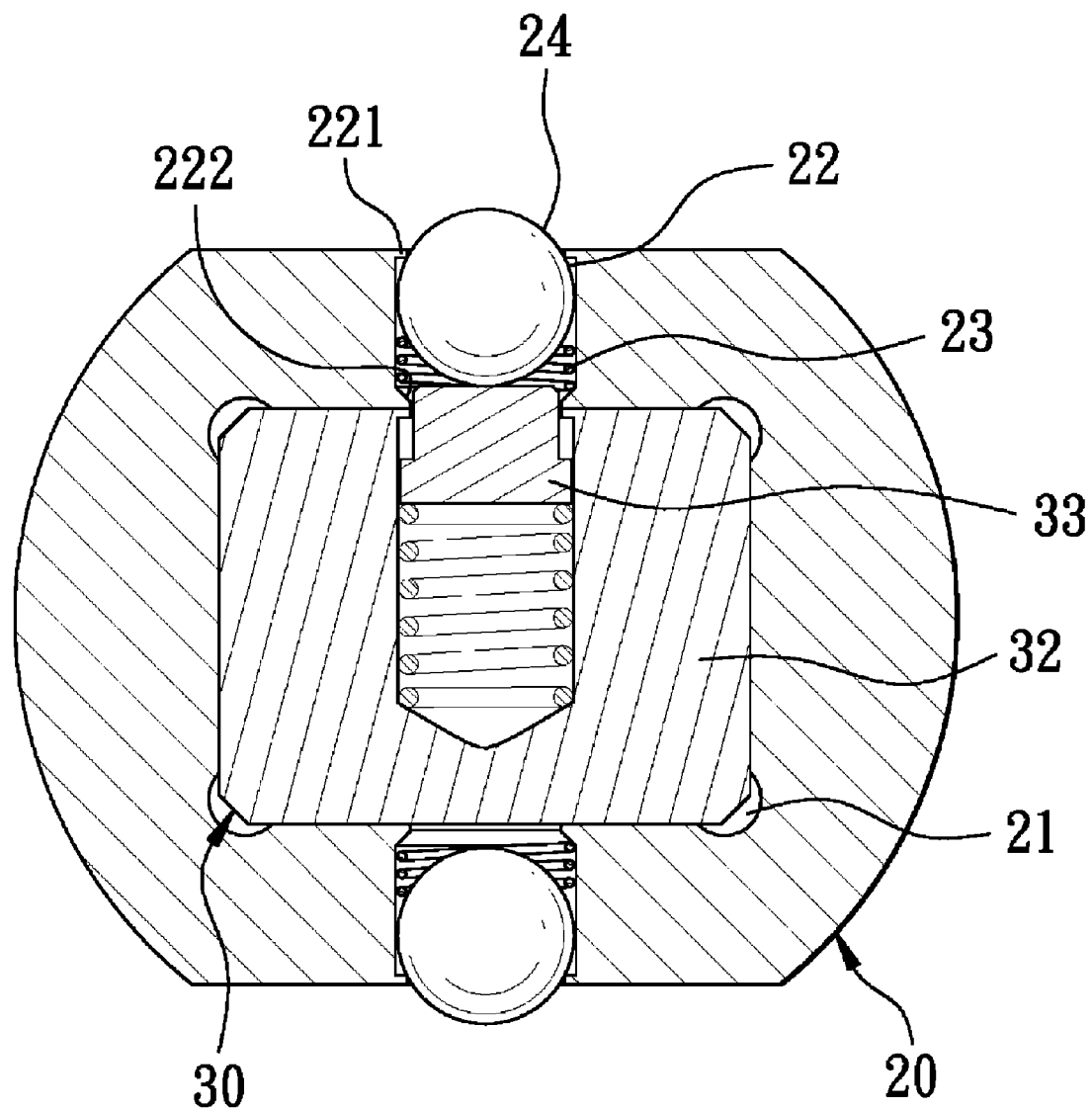
FIG. 5 is a cross-sectional view of the first preferred embodiment of the safe and quick release device for a tool adapter in the present invention.

A first preferred embodiment of a safe and quick release device for a tool adapter in the present invention, as shown in FIGS. 3, 4 and 5, includes a main body 20 and a combination head 30 as main components combined together.

The main body 20 has its front end axially bored with a combination groove 21 formed with an open end and having its opposite sides respectively and oppositely bored with a position-limiting hole 22, which has its lower side formed with a first slotted position-limiting portion 221 protruding toward the combination groove 21. The slot diameter of the position-limiting portion 221 is smaller than that of the position-limiting hole 22. An elastic member 23, a spring, is provided in the position-limiting hole 22 at a location near the combination groove 21, and a position-limiting member 24, a spherical steel ball, is also slidably disposed in the position-limiting hole 22. Steel balls are commonly used for the position-limiting member 24, easily available, able to reduce processing cost. The elastic member 23 can function to push against the position-limiting member 24 with its elasticity. After the elastic member 23 and the position-limiting member 24 are assembled in the position-limiting hole 22, the position-limiting hole 22 has its upper opening side annularly formed with a second position-limiting portion 222 made up of compressed points formed by compression. The diameter of the position-limiting member 24 is larger than that of the first and the second position-limiting portion 221 and 222, letting the position-limiting member 24 restrictedly positioned by the first and the second position-limiting portion 221, 222, but somewhat protuberant out of the first and the second position-limiting portion 221, 222.

The combination head 30 has its front end connected with a tool head 31, which can be a spanner, a screw-driver, a sleeve or the like, and its rear end is provided with a combination end 32 to be combined with the combination groove 21 of the main body 20. The combination end 32 has its opposite sides respectively fixed with an elastic protruding block 33.

Figure 6:
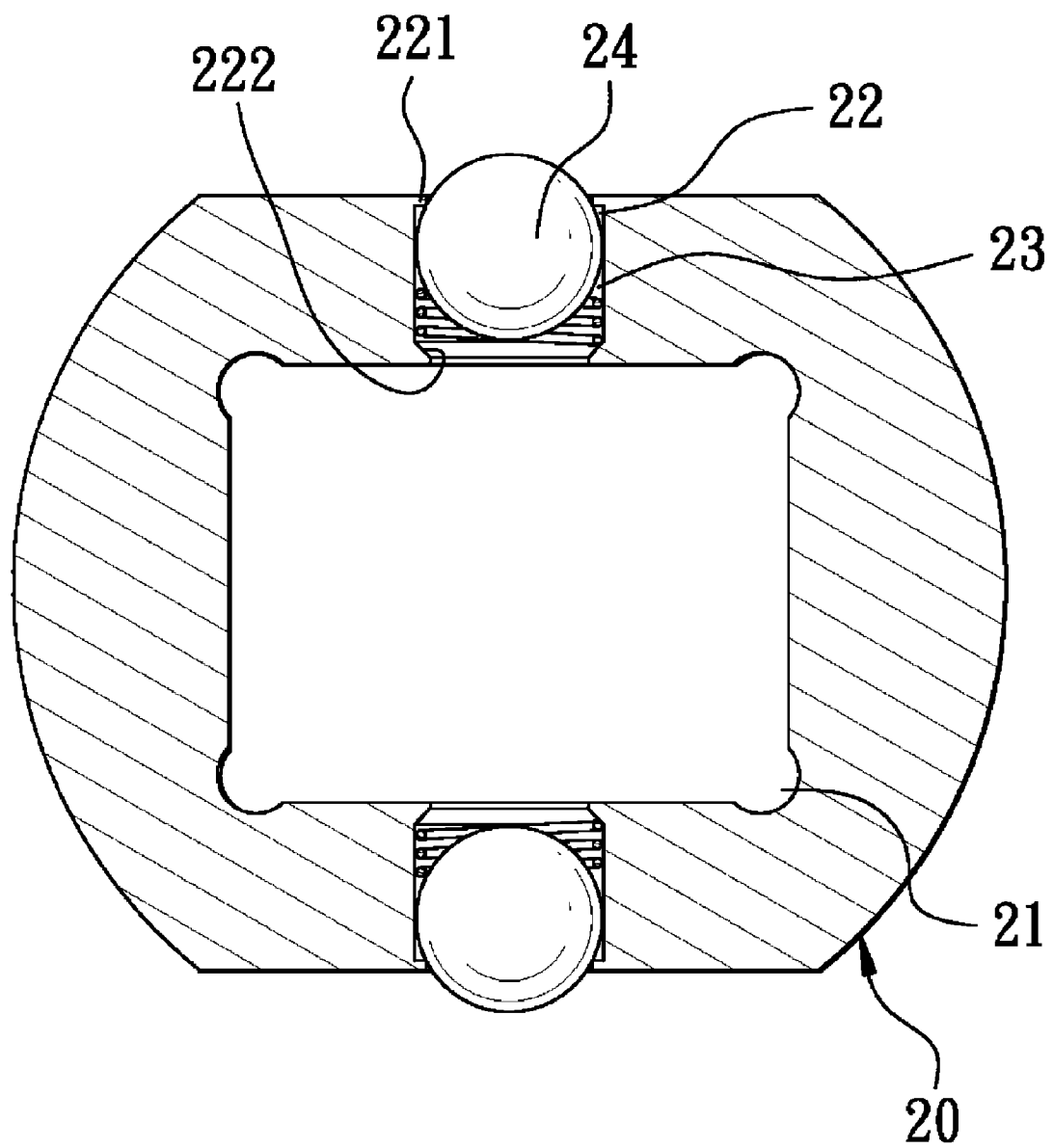
FIG. 6 is a cross-sectional view of the first preferred embodiment of the safe and quick release device for a tool adapter, which is not yet assembled, in the present invention.

Referring to FIGS. 4, 5 and 6, after the combination head 30 is combined with the main body 20, elastic protruding blocks 33 of the combination head 30 will be respectively fitted in the position-limiting holes 22 at the opposite sides of the combination groove 21 of the main body 20, thus enabling the combination head 30 to be easily assembled with the main body 20. At this time, the position-limiting member 24 will be actuated by the elastic force of the elastic member 23 to protrude a little out of the second position-limiting portion 222 for facilitating assembling of the combination head 30, and the elastic protruding block 33 of the combination head 30 will be elastically and firmly engaged in the position-limiting hole 22 of the main body 20. To disassemble the combination head 30 from the main body 20, only press down the position-limiting member 24 to restrain the elastic force of the elastic member 23 and have the lower side of the position-limiting member 24 pressing the elastic protruding block 33 to disengage from the position-limiting hole 22. After the combination head 30 is disassembled from the main body 20, stop applying force to enable the position-limiting member 24 to move back to its original position by the elastic force of the elastic member 23.

Figure 7:
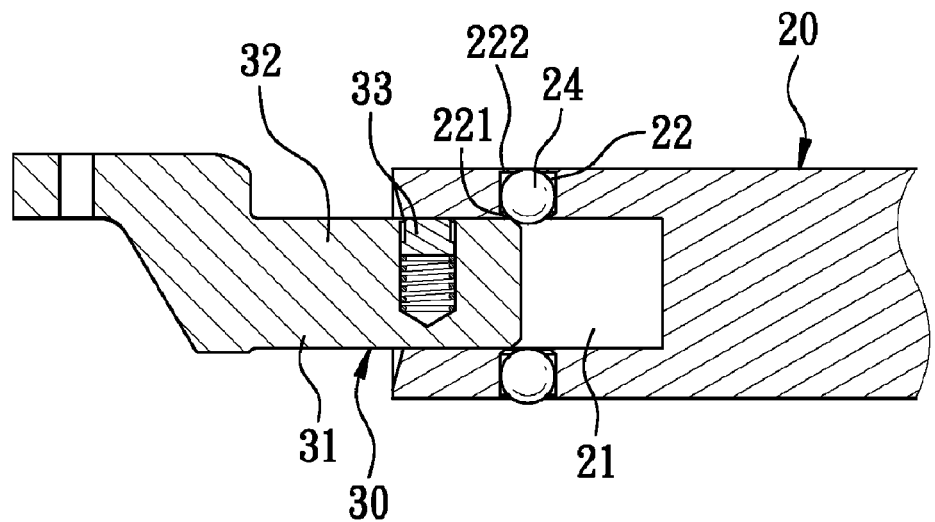
FIG. 7 is a cross-sectional view of a second preferred embodiment of a safe and quick release device for a tool adapter to be combined in the present invention.
Figure 8:
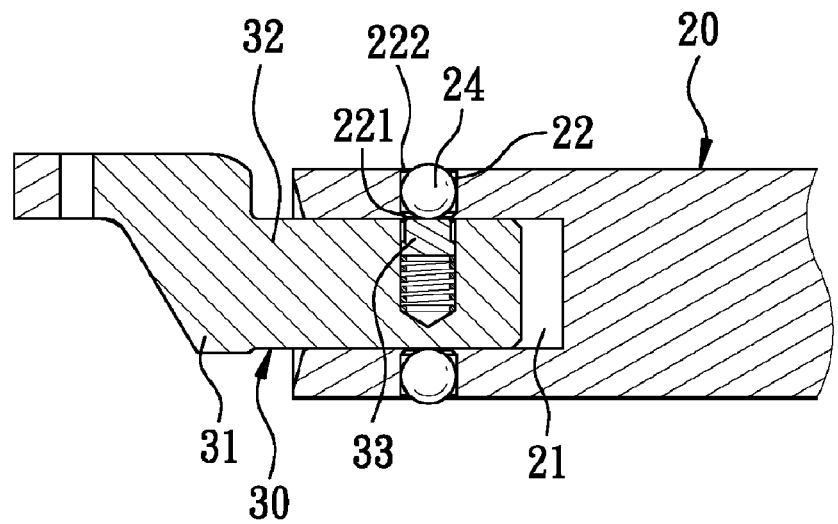
FIG. 8 is a cross-sectional view of the second preferred embodiment of the safe and quick release device for a tool adapter in an assembled condition in the present invention.

A second preferred embodiment of a safe and quick release device for a tool adapter in the present invention, as shown in FIGS. 7 and 8, has almost the same structure as that described in the first preferred embodiment, except that the position-limiting hole 22 is only provided therein with the position-limiting member 24. When the combination head 30 is not yet assembled with the main body 20, the position-limiting member 24 will drop down due to its own weight, and after the combination head 30 is combined with the main body 20, the position-limiting member 24 with an arc-shaped surface will slide on the surface of the combination end 32, able to avoid impeding assembly of the combination head 30. When the elastic protruding blocks 33 of the combination head 30 are respectively engaged in the position-limiting holes 22 of the main body 20, the elastic protruding block 33 will naturally push the position-limiting member 24 to move upward and have its topside protruding out of the position-limiting hole 22, thus facilitating pressing of the position-limiting member 24 for disassembling the combination head 30.

While the preferred embodiments of the invention have been described above, it will be recognized and understood that various modifications may be made therein and the appended claims are intended to cover all such modifications that may fall within the spirit and scope of the invention.

I claim:

1. A safe and quick release device for a tool adapter, said device comprising:
    a main body having its front end axially bored with a combination groove with an open end;
    said combination groove having its side bored with at least one position-limiting hole;
    said position-limiting hole having its opposite openings respectively and annularly formed with a first position-limiting portion and a second position-limiting portion;
    a position-limiting member being a spherical body;
    said position-limiting member received in said position-limiting hole and restrictedly positioned therein by said first position-limiting portion and said second position-limiting portion; and
    said second position-limiting portion is compression formed with compressed points at an upper side of said position-limiting hole.

2. The safe and quick release device for a tool adapter as claimed in claim 1, wherein said position-limiting member is a steel ball.

3. The safe and quick release device for a tool adapter as claimed in claim 1, wherein said first position-limiting portion is bored with a through hole at a lower side of said position-limiting hole, said through hole formed with a diameter smaller than that of said position-limiting hole.

4. The safe and quick release device for a tool adapter as claimed in claim 1, wherein said position-limiting member is disposed with an elastic member at a location adjacent to one side of said combination groove.

5. The safe and quick release device for a tool adapter as claimed in claim 1, wherein said combination groove has its opposite sides respectively bored with a position-limiting hole aligned to each other and having a position-limiting member slidably installed therein.

\* \* \* \* \*